United States Patent [19]

Servassier

[11] 3,996,795
[45] Dec. 14, 1976

[54] IONIZATION FLOW DETECTOR
[75] Inventor: Alfred Servassier, Versailles, France
[73] Assignee: Institute Francaise du Petrole, des Carburants et Lubrifiants et Entreprise de Recherches et d'Activities Petrolieres Elf, Paris, France
[22] Filed: Dec. 11, 1974
[21] Appl. No.: 531,508
[30] Foreign Application Priority Data
 Dec. 11, 1973 France .............................. 73.44237
[52] U.S. Cl. ............................................. 73/194 F
[51] Int. Cl.² ......................................... G01F 1/56
[58] Field of Search ..................... 73/194 F; 324/33
[56] References Cited
UNITED STATES PATENTS

| 2,861,452 | 11/1958 | Morgan | 73/194 F |
|---|---|---|---|
| 3,648,517 | 3/1972 | Dorman | 73/194 F |
| 3,706,938 | 12/1972 | Petriw | 73/194 F X |
| 3,750,469 | 8/1973 | Storey | 73/194 F |
| 3,831,445 | 8/1974 | Durbin | 73/194 F |
| 3,835,705 | 9/1974 | Hadjidjanian | 73/194 F |

*Primary Examiner*—Charles A. Ruehl
*Attorney, Agent, or Firm*—Sughrue, Rothwell, Mion, Zinn & Macpeak

[57] ABSTRACT

An electrode $E_1$ having the design function of an ion source is placed in a gas stream and emits by corona discharge effect ions which are collected on two electrodes $E_2$ and $E_3$. These electrodes consist of grids placed at right angles to the direction of the gas stream on each side of the electrode $E_1$ at approximately equal distances from this latter. The device comprises electronic means for amplifying the currents collected at the electrodes $E_2$ and $E_3$ as well as for calculating the difference and the sum of the currents collected at the electrodes after amplification.

12 Claims, 10 Drawing Figures

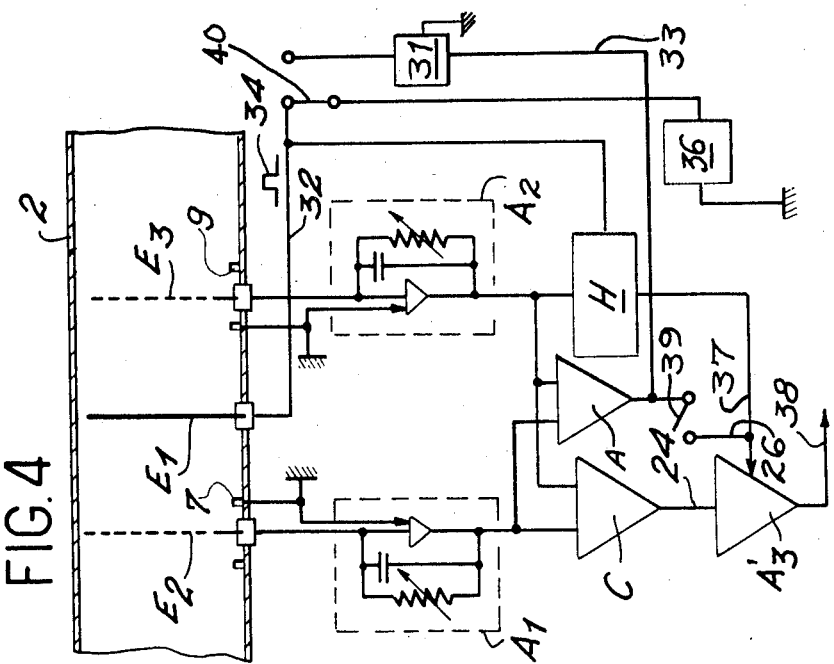
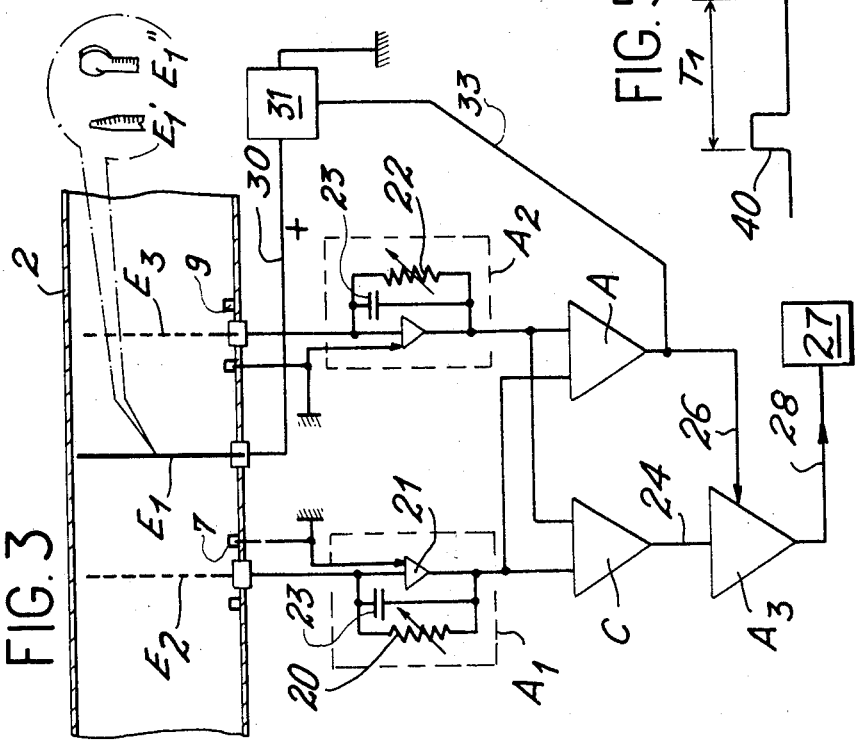
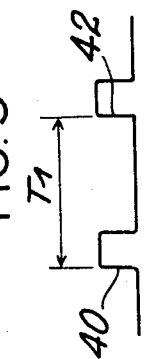

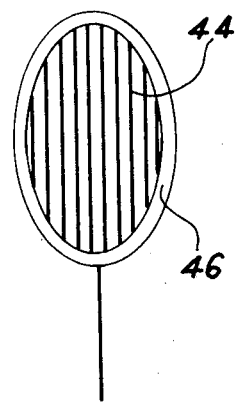
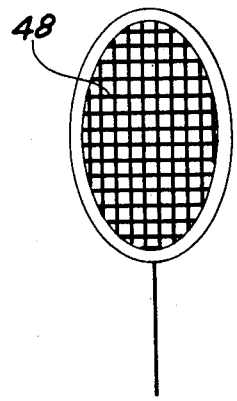
FIG. 6　　　FIG. 7
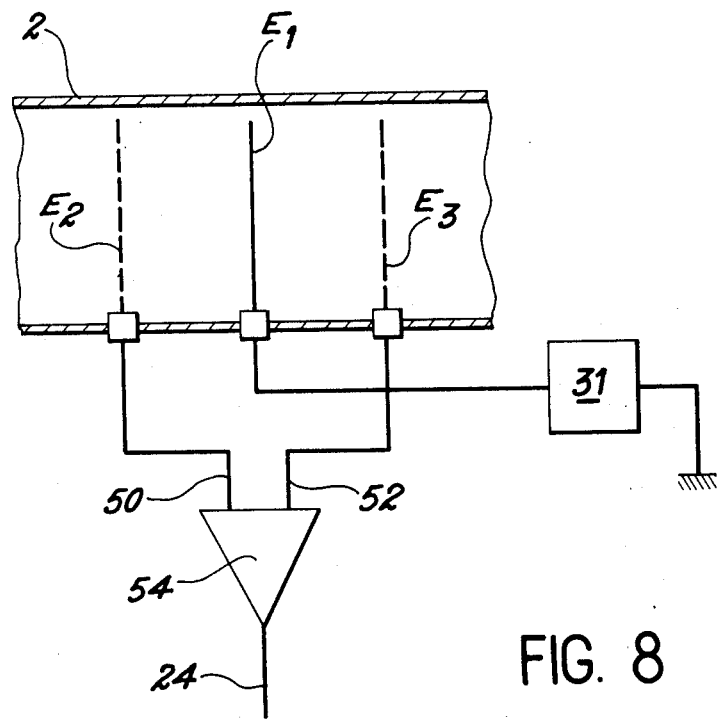
FIG. 8

IONIZATION FLOW DETECTOR

BACKGROUND OF THE INVENTION

This invention relates to ionization flow detectors for measuring the velocity of flow of a gas stream as well as for measuring the mass flow of said gas stream. Depending on whether the measurement is more especially oriented towards the mass flow rate or towards the gas flow velocity, these instruments have different names such as fluxmeters, anemometers, flow detectors or finally flowmeters.

The flow detectors of the prior art were initially constituted by a moving element which rotated under the influence of the gas stream. The speed of rotation of said element gave a measurement of the velocity of flow but the inertia of these instruments and the considerable changes in the flow regime caused by the presence of these latter are disadvantages which often prohibit their use. Furthermore, these mechanical devices are liable to lose their effectiveness in the course of time and can be employed only within limited ranges of temperature and pressure; they can also be employed only with non-corrosive gases.

Ionization flow detectors such as those described in Pat. Nos. EN 70 28636 corresponding to U.S. Pat. No. 3,750,469 and EN 71 18280 (corresponding to U.S. Pat. No. 3,835,705) relate to ionization flowmeters in which the ion source is produced by an electrode located in the gas stream. These ions are accelerated by means of another electrode placed opposite to the ion formation electrode. The ion path between the two electrodes is approximately perpendicular to the direction of the gas stream. The result achieved by this arrangement of electrodes is that, when the gas flows between said electrodes, the ions are entrained by the gas stream and are localized at a collection point on the electrode (or electrodes) which is no longer opposite to the formation electrode. A number of different systems have been proposed for measuring this displacement.

These systems in which the displacement of ions takes place at right angles to the direction of flow give rise to a number of disadvantages; in the first place, the sensitivity of such systems is fairly small since the measurement is applied to one velocity component at right angles to the primary ion velocity. Furthermore, the ions produced are of different types: the heavy ions arising from the presence of steam which condenses on the side walls of the flowmeter, namely the walls on which the electrodes are placed, have an ion velocity which is lower than that of the ions of the gas stream, thus causing increased deflection of the ion beam at a constant velocity of the gas stream. When heavy ions are present, the detectors which make use of this type of device provide an indication which is higher than the true value of the velocity of the gas stream and fail to ensure accuracy of response. Furthermore, the indications given by these detectors are extremely sensitive to variations in pressure of the gas which flows between the two electrodes as well as to temperature variations; the laws which give the rate of flow as a function of displacement, of temperature and of pressure are fairly complex laws which make corrections both uncertain and difficult.

SUMMARY OF THE INVENTION

The aim of the present invention is to provide an ionization flow detector in which the ions are accelerated between the electrodes in a direction parallel to the flow of the gas stream, thus making the instrument more sensitive than in the prior art. Furthermore, in another embodiment of the invention, it is possible to calibrate the instrument according to the gas mixture in which it is desired to measure the rate of flow, with the result that an absolute measurement is taken of said flow rate. In one embodiment of the invention, the corrections resulting from the variations in composition of the gas mixture and from the variations in the electric power supply are taken into account automatically.

In more precise terms, the present invention is directed to an ionization flow detector employed in a gas in which an electrode $E_1$ having the intended function of an ion source is placed in a gas stream and emits by corona effect ions which are collected on two electrodes $E_2$ and $E_3$. The invention is distinguished by the fact that the two electrodes $E_2$ and $E_3$ are constituted by grids placed at right angles to the direction of the gas stream and disposed on each side of the electrode $E_1$ approximately at equal distance from said electrode $E_1$, that the potential of the electrode $E_1$ has a sufficient value to produce the corona effect, and that said device comprises electronic means for amplifying the currents collected at the electrodes $E_2$ and $E_3$ as well as for calculating the difference and the sum of the currents collected at said electrodes after amplification.

The electrode $E_1$ is at a positive potential with respect to the electrodes $E_2$ and $E_3$, with the result that the positive ions are attracted by the electrodes $E_2$ and $E_3$. When there is no gas flow, the ions are caused to move at a velocity $V_i$ between two electrodes. The flow entrains the ions produced in the vicinity of the electrode $E_1$ at a velocity $V_g$. This overall velocity $V_g$ is added algebraically to their velocity $V_i$. The velocity $V_g$ is equal to and in the same direction as the velocity of the gas flow. If the gas flow takes place from the electrode $E_2$ to the electrode $E_3$, the ions produced by the electrode $E_1$ more towards the electrode $E_3$ at a velocity $V_i + V_g$ and towards the electrode $E_2$ at the velocity $V_i - V_g$, with the result that the electrode $E_3$ receives a greater number of ions than the electrode $E_2$ per unit of time. The currents collected by each electrode are amplified in order to ensure that, as will be explained in greater detail below, the measurement of the difference between said currents permits a measurement of the velocity $V_g$ of the gas flow.

In a preferential embodiment of the invention, the electrode $E_1$ of the ionization flow detector is constituted by a wire of small diameter which is stretched across the gas flow. In this embodiment of the invention, the potential of the electrode $E_1$ and its radius of curvature are such that the electric field in the vicinity of the electrode $E_1$ is of higher strength than the breakdown field of the gas considered. This breakdown field depends on the nature of the gas employed but is of the order of several tens of kV per cm. Around the wire constituting the electrode $E_1$, the radial electric field varies according to a law which is inversely proportional to the radius. Within a small cylindrical space around said electrode $E_1$ in which the cylinder axis is constituted by the wire, the electric field is stronger than the breakdown field and electron-ion pairs are formed. The ions are then accelerated towards the electrodes which are negative with respect to the electrode $E_1$, that is to say towards the electrodes $E_2$ and $E_3$. All other things being equal, the total current S is proportional to the volume of the cylinder within which the field E exceeds the value of the breakdown field (30 kV per cm in air). The volume of said cylinder is proportional to the square of the radius of the base circle, the perimeter of the circle being formed by the set of points at which the value of the electric field is precisely equal to the breakdown field. Since the value of said radius is proportional to the electric potential U of the electrode $E_1$, the total ion current is proportional to the square of the potential U.

$$S = k (U - U_0)^2,$$

where $k$ is a coefficient of proportionality and $U_0$ is the potential of the electrode $E_1$ at which the electric field in the immediate vicinity of the wire is equal to the breakdown field in the gas considered. The electrode $E_1$ constituted by a wire stretched across the gas flow constitutes the preferential embodiment of the invention.

Depending on the applications which are contempleted, it can prove necessary to employ other forms of electrodes in accordance with alternative embodiments of the invention, such as pin whose extremity is located in the vicinity of the axis of the electrodes $E_2$ and $E_3$, said axis being parallel to the direction of the gas flow.

In one alternative embodiment of the invention, the electrode $E_1$ has the shape of a flat disc of small diameter which is placed within the gas flow.

In another alternative embodiment of the inventions, the electrode $E_1$ is constituted by a grid of parallel or crossed wires, the plane of the grid being at right angles to the gas flow and parallel to the electrodes $E_2$ and $E_3$.

In accordance with the invention, the electrodes $E_2$ and $E_3$ are grids in order to ensure the least possible interference with the gas flow which circulates through said grids (the grid-mesh being of sufficient width to avoid any appreciable interference with the gas flow). It is usually considered that the flow is modified to a considerable extent over a distance measured along the axis of the grids which is equal to several times the width of a mesh. The electrode $E_1$ is disposed at a distance from the electrodes $E_2$ and $E_3$ which is substantially greater than several times the mesh width.

In one embodiment of the invention, guard electrodes are placed around the electrodes $E_2$ and $E_3$ in order to eliminate the surface currents between the electrode $E_1$ and the two electrodes $E_2$ and $E_3$.

In order that the invention and the different advantages which it offers may be more clearly understood, different values relating to the physical aspect of the phenomenon are defined hereinafter.

When there is no flow of gas, the ions emitted by the electrode $E_1$ are accelerated by the potential difference towards the electrodes $E_2$ and $E_3$ and undergo a large number of collisions with the non-ionized gas. In the absence of any gas flow, the velocity of the ions is designated by $V_i$. The formula which gives the ion velocity is:

$$V_i = \frac{eE}{m} \tau$$

where $e$ is the charge of the ion, E is the acceleration electric field between the electrode $E_1$ and the electrodes $E_2$ and $E_3$, $m$ is the mass of the ion and $\tau$ is the mean transition time, that is to say the time interval which elapses between two collisions of an ion with the molecules of the surrounding gas. The time interval $\tau$ is given by the formula:

$$\tau = \frac{1}{n\sigma V_o}$$

where $n$ is the number of molecules per unit of volume of the surrounding neutral gas, $\rho$ is the collision cross-section of the ion and $V_o$ is the mean rate of thermal agitation of the gas molecules. In the case of air mentioned herein by way of example, the cross-section $\rho$ is approximately equal to $12 \times 10^{-16}$ cm$^2$. Under normal conditions of temperature and pressure, the number of molecules per unit of volume is approximately $2.7 \times 10^{25}$ molecules/m$^3$. So far as concerns the velocity $V_o$ at room temperature, this velocity has a value of approximately 400 m/second. We then have $\tau = 7 \times 10^{-10}$ sec$^{-1}$. In accordance with these values, the velocity of the ions after ionization is equal to approximately 60 m/second in respect of an interelectrode electric field of 10 kV/cm. Accordingly, if it is found feasible to detect current variations of the order of one hundredth of a second arising from the ion entrainment gas flow, it is clearly possible to detect gas velocities of the order of several meters per second. Should it be desired to measure lower rates of flow, it is obviously necessary to place the two electrodes at greater distances from each other (with a constant interlectrode potential difference) in order to ensure that the electric field which accelerates the ions between two collisions decreases. A further alternative consists in reducing the potential applied between the two electrodes $E_1$ and $E_2$ or $E_1$ and $E_3$ and to reduce at the same time the radius of curvature of the wire which constitutes the electrode $E_1$ in order that the electric field in the vicinity of said wire should be stronger than the breakdown field in the gases considered. In accordance with these formulae, it is clear that the velocity of the ions between two electrodes is dependent on the nature of the gas through the parameters $e, m, \rho, V_o$; this velocity $V_i$ also depends on the gas pressure through the parameter $n$ (number of molecules per unit of volume) and on the temperature through the mean velocity $V_o$ of the gas.

In accordance with the invention, the ionization flow detector comprises:
- guard rings around the electrodes $E_2$ and $E_3$,
- a high voltage supply connected between the electrode $E_1$ and each of the electrodes $E_2$ and $E_3$,
- variable-gain amplifiers $A_1$ and $A_2$ connected to each of the electrodes $E_2$ and $E_3$,
- a comparator C whose inputs are connected to the outputs of the amplifiers $A_1$ and $A_2$, the output current of said comparator C being proportional to the difference between said input currents.

The amplifiers $A_1$ and $A_2$ amplify the current applied to the electrodes $E_2$ and $E_3$. The comparator C determines the difference between the two currents $I_1$ and $I_2$ received by the two electrodes $E_2$ and $E_3$.

In another embodiment of the invention, the comparator-amplifier assembly is replaced by an operational amplifier mounted as a differential amplifier. In this case the guard rings or electrodes are either dispensed with or connected to each other.

The gains of the amplifiers are so adjusted as to ensure that, when the gas current is zero ($V_g = 0$), the comparator produces a zero result. The current $I_1$ is equal to the number of charges transported multiplied by their velocities. In the presence of a gas current, we have:

$$I_1 = n_o e(V_i - V_g) S_o$$

and $$I_2 = n_o e(V_i + V_g) S_o;$$

$S_o$ is the surface area of the electrodes $E_2$ and $E_3$.

As already mentioned in the foregoing, the coefficients of amplification $K_1$ and $K_2$ of the amplifiers $A_1$ and $A_2$ are so adjusted as to ensure in the case of a zero gas current that $I'_1 = I'_2 = K_1 I_1 = K_2 I_2$ ($V_g = 0$) are present at the output of the amplifiers $A_1$ and $A_2$. In the presence of a gas current, we have $I'_1 = K_1 e n_o (V_i - V_g) S_o$ and $I'_2 = K_2 e n_o (V_i + V_g) S_o$. The difference $\Delta i$ obtained at the output of the comparator has the value:

$$\Delta i = I'_2 - I'_1 = S_o(K_1 + K_2) e n_o V_g S_o$$

Thus the current difference $\Delta i$ is proportional to the number $n_o$ of ions per unit of volume and to the velocity $V_g$ of the gas current. This number $n_o$ of ions per unit of volume is proportional to the number of molecules per unit of volume, or in other words proportional to the pressure of the gas and inversely proportional to the temperature. These ions are produced within the cylindrical space which surrounds the electrode $E_1$. The number $n_o$ is related to the number $n$ of molecules per unit of volume according to a law which we shall not explain in detail but which establishes a one-to-one correspondence between a number $n_o$ and each value of the number $n$ of gas molecules per unit of volume. Thus the current difference $\Delta i$ in the presence of a gas current is proportional to the number of gas molecules and to the velocity of said gas. If the mass of the gas molecules is known, the current difference $\Delta i$ will indicate the mass flow rate of the apparatus. But in order to achieve this result, it is important to know the different constants of proportionality and this would involve very difficult calibration of the instrument. In order to avoid these difficult measurements, the total current collected by the two electrodes is measured, namely:

$S = I'_1 + I'_2 = (K_1 + K_2) S_o e n_o V_i$. The ratio $\Delta i/S$ is reduced to $V_g/V_i$. This law is exact irrespective of the conditions of temperature and pressure:

$$\frac{\Delta i}{S} = \frac{V_g}{V_i}$$

In accordance with the invention, in order to take into account any possible variations in the velocity of the ions between the electrodes $V_i$ which may be due to possible variations in the nature of the gas and in the voltage applied between the two electrodes, the ionization flow detector comprises:

a current adder A whose inputs are connected to the outputs of the amplifiers $A_1$ and $A_2$, the output current of the adder A being proportional to the sum of said input currents and an amplifier $A_3$ in series with the comparator C, the gain of which is inversely proportional to the output current of the adder A. There will thus be delivered at the output of the amplifier $A_3$ a signal which is proportional to the velocity $V_g$ of the gas flow, and is independent of the variations in the velocity $V_i$ of the ions between anode and cathode.

The device under consideration makes it possible to obtain the precise relative value of the variations of the velocity $V_g$ (and of the mass flow rate) when the mass of the constituents of the gas flow mixture is already known. In order to obtain the velocity $V_g$ at absolute value, it is necessary to determine the ion velocity $V_i$.

In order to determine the precise value of the ion velocity between anode and cathode, it is possible to measure the different constants $K_1$, $K_2$, $S_o$ and $n_o$ of the system but this is a difficult operation. It is also possible to calibrate the instrument with a given gas having a known flow rate, thus giving the value $V_i$ once and for all. In accordance with one embodiment of the invention, it is also possible to carry out a direct measurement of the time of flight $T_1$ of the ions between cathode and anode; when this time of flight and the interlectrode distance L are known, we have $V_i = L/T_1$; to this end, the detector in accordance with the invention comprises:

means for transmitting positive voltage pulses of variable duration to the electrode $E_1$;

a clock for measuring the time interval $T_1$ which elapses between the current pulse applied to at least one of the electrodes $E_1$ and $E_2$ and the voltage pulse which is transmitted to the electrode $E_1$.

Said clock determines the time interval $T_1$ and consequently the velocity $V_i$ of the ions when the gas current is zero. The invention also includes means for adjusting the gain of an amplifier $A'_3$ in inverse ratio to the time interval $T_1$, said amplifier being placed in series with the amplifiers $A_1$ and $A_2$.

Accordingly, any possible variations of the ion velocity $V_i$ are taken into account and corrected automatically. This value of time $T_1$ can also be introduced in order to adjust the gain of the amplifier $A_3$, said gain being subsequently varied about this value according to the sum S of the currents $I'_1$ and $I'_2$. There is then obtained an absolute measurement of the gas velocity $V_g$ and an absolute measurement of the mass flow rate of said gas is also obtained if the molar mass of the circulating gas is known.

In accordance with the invention, the supply B placed between the electrode $E_1$ and the electrodes $E_2$ and $E_3$ is a stabilized source having either constant current or constant potential or a constant load line.

In an alternative embodiment of the invention, the sum S of the currents is employed for adjusting the value of the high voltage applied to the electrode $E_1$ so that the sum of the currents accordingly remains constant.

In accordance with the invention, an integrator is placed after the last amplifier which amplifies the difference $\Delta i$ between the currents $I'_1 - I'_2$ (the amplifiers $A_3$ or $A'_3$), there being consequently obtained at the output the total quantity of gas which has passed through the flow detector during the integration time, thus obtaining the cumulated flow rate during a given period of time.

BRIEF DESCRIPTION OF THE DRAWINGS

Further properties and advantages of the invention will be brought out more clearly by the following description of exemplified embodiments which are given by way of explanation without any limitation being implied, reference being made to the accompanying drawings, in which:

FIG. 3 is a diagram of the electronic device which is connected to electrodes $E_1$, $E_2$ and $E_3$ in the case in which the gain of the amplifier $A_3$ is modified by means of an amplifier A which measures the sum of the currents delivered by the electrodes $E_2$ and $E_3$;

FIG. 4 is a diagram of the electronic device for measuring the time of flight of ions between the electrodes;

FIG. 5 represents the voltage and current pulses for measuring the time of flight $T_1$;

FIG. 6 is a diagram of an electrode $E_1$ in the form of a grid consisting of parallel wires;

FIG. 7 is a diagram of an electrode $E_1$ in the form of a grid consisting of crossed wires;

FIG. 8 is a diagram of an alternative design of the electronic device for subtracting the currents $I_1$ and $I_2$;

DESCRIPTION OF THE PREFERRED EMBODIMENT

Figure 1:
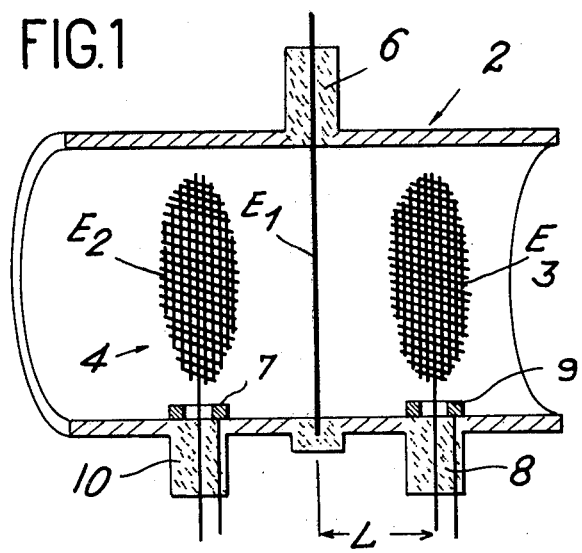
FIG. 1 is a sectional view of the ionization flow detector in accordance with the invention.

The ionization flow detector in accordance with the invention is shown in the sectional view of FIG. 1 and comprises a cylindrical tube 2 of insulating material, a flow of gas being circulated within said tube in the direction of the arrow 4 and passed through the electrodes $E_2$ and $E_3$. In this example of construction, the electrode $E_1$ is a wire electrode which passes through a sleeve 6. The electrodes $E_2$ and $E_3$ are supplied with current through the lead-in bushings 8 and 10. Said electrodes $E_2$ and $E_3$ can take up either all or part of transverse cross-section of the cylinder 2 and can have an oval, square or circular shape without modifying the operation of said electrodes or the device in accordance with the invention to any appreciable extent.

The guard rings surrounding the electrodes $E_2$ and $E_3$ are illustrated at 7 and 9.

Figure 2:
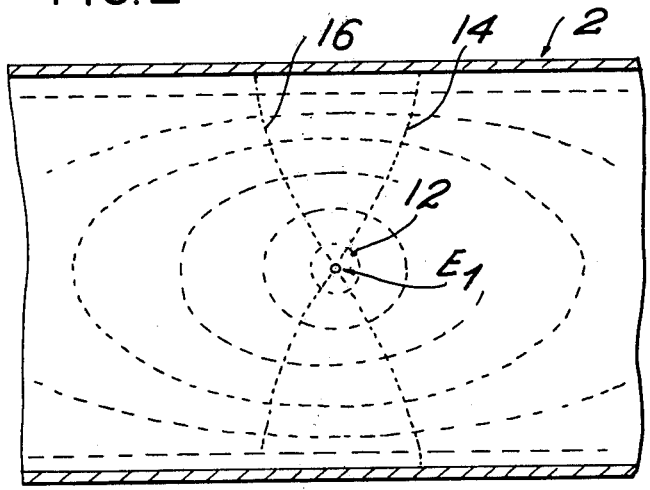
FIG. 2 is a top view of the electric field surrounding the central wire electrode $E_1$.

The wire electrode $E_1$ and the equipotential lines surrounding said wire electrode are shown in the top view of FIG. 2. In the immediate vicinity of the electrode, the equipotential surfaces have the shape of a cylinder, thus forming circles such as 12 in cross-section. The formation of electron-ion pairs by corona discharge takes place within the interior of the cylinder defined by the circle 12. As the distance from the wire constituting the electrode $E_1$ increases, so the equipotential surface then become ovalized. Two electric field lines are represented at 14 and 16 and are perpendicular to the equipotential lines.

FIG. 3 is an electronic diagram in accordance with the invention for amplifying, establishing the difference and correcting the signal corresponding to the velocity of the gas flow. A first amplifier $A_1$ is connected to the electrode $E_2$ and consists of an operational amplifier 21 provided with a feedback loop in which the variable resistor 20 has a value of the order of a few megohms whilst the apparent resistance between $E_1$ and $E_3$ is of the order of 1000 megohms (corresponding to a current of 10 $\mu$A in respect of a potential difference of 10 kV). A capacitor as designated by the reference 23 eliminates the spurious high-frequency signals (above 2 kc/s) which are not amplified in the amplifiers such as 21. The amplifier $A_2$ which is placed at the output of the electrode $E_3$ is similar in design to the amplifier $A_1$. The resistor 22 has approximately the same value as the resistor 20. Provision is made at the output of the amplifiers $A_1$ and $A_2$ for a comparator C which establishes at its output at 24 the difference between the currents which are amplified and delivered by the electrodes $E_2$ and $E_3$. Said signal 24 which is equal to the difference $\Delta i$ between the currents is amplified by the amplifier $A_3$, the gain of which is adjusted according to the arrow 26 by the result of the addition obtained at A of the currents $I_1$ and $I_2$ after amplification within $A_1$ and $A_2$. There is obtained at the output 28 a signal which is proportional to the velocity of the gas $V_g$ within the detector. An integrator 27 integrating the signals at the output 28 of amplifier $A_3$ may be added in series with the amplifier $A_3$ in order to measure the total quantity of gas having gone through the detector for a given length of time equal to the integration time of integrator 27. The high voltage supply 31 delivers a positive direct-current potential to the electrode $E_1$.

In an alternative arrangement of the device according to the invention, the high voltage supply 31 is controlled in dependence on the result of the addition of the currents by means of the line 33. In addition, FIG. 3 shows two embodiments wherein electrode $E_1$ is a pin $E_1'$ or a small disk $E_1''$ which extends only to the central axis of cylinder 2 as shown.

FIG. 4 shows the same detector associated with the amplifiers $A_1$ and $A_2$. This FIGURE shows an embodiment whereby automatic calibration of the gain of amplifier $A'_3$ is accomplished. In FIG. 3, the voltage applied to the electrode $E_1$ at 30 was positive and direct whereas in FIG. 4, the voltage applied to the same electrode $E_1$ 36 via the line 32 during calibration has the shape of a positive square-wave 34. The time interval or difference $T_1$ between the inflow of the current derived from the electrode $E_3$ and the application to voltage to the electrode $E_1$ by the signal 34 is counted by the clock H and this latter transmits a signal which is proportional to said time difference and serves to control the gain of the amplifier $A'_3$ in the direction of the arrow 37 in inverse ratio to said time interval $T_1$. The comparator C measures the difference between the signals obtained after the current has passed through the amplifiers $A_1$ and $A_2$. There is obtained at 38 a signal which is equal to the gas flow rate within the flow detector. The measurement of the time of flight, that is to say the time of transition of the ions between the electrode $E_1$ and $E_2$ is employed for measuring the absolute velocity $V_g$ of the gas within the flow detector. It will be recalled that the basic equation describing the relationships measured by the detector is as follows $$\frac{\Delta i}{S} = \frac{V_g}{V_i}$$

where $V_g$ is the gas velocity, $V_i$ is the ion velocity (when no gas is flowing), $\Delta i$ is the difference of the outputs of amplifiers $A_1$ and $A_2$, and $S$ is the sum of the outputs of amplifiers $A_1$ and $A_2$. Solving for the gas velocity $V_g$ in the above expression, the following equation is obtained:

$$V_g = \frac{\Delta i}{S} \times V_i.$$

Thus, the circuit of FIG. 3 will measure the gas velocity $V_g$ as a function of the ion velocity $V_i$. The calibration circuitry incorporated into the embodiment illustrated in FIG. 4 permits the absolute measurement of gas velocity $V_g$. The ion velocity $V_i$ is given by the following expression:

$$V_i = \frac{L}{T_1}$$

where L is the interelectrode distance and $T_1$ is the time of flight of the ions from the electrode $E_1$ to one or the other of the electrodes $E_2$ or $E_3$ when no gas is flowing. Thus, the clock H provides means for adjusting the initial gain of amplifier $A'_3$ in inverse ratio to the time interval $T_1$ so that the output of amplifier $A'_3$ at line 38 is given by the following expression:

$$V_s = \frac{\Delta i L}{S T_1}.$$

During the calibration process, the switches 39 and 40 are switched to the positions shown in the figure to disconnect the output of amplifier A from the gain conrol line 37 and to connect pulsed power supply 36 to electrode E, in place of power supply 31. Once calibration is completed the switch 39 is closed so that the gain of the amplifier $A'_3$ is controlled by the output of amplifier A about the value established by the clock H.

FIG. 5 shows the high voltage signal 40 at the electrode $E_1$ and the response 42 of the current delivered by the amplifier $A_1$. It can readily be understood that an amplifier $A_1$ having a very short response time will be selected for this measurement. The time interval $T_1$ is the time of transition of the ions between the electrodes $E_1$ and $E_2$. The velocity $V_i$ of the ions between these two electrodes is equal to the time interval $T_1$ divided by the distance L between the two electrodes $E_1$ and $E_2$.

In one example of construction, the copper grids have a diameter of 34 mm and are placed at the center of a polyvinyl chloride tube 80 mm in diameter. These grids are fabricated from brass wire 1/10 mm in diameter; the wires being spaced at a distance of 2/10 mm, the mesh size is 3/10 mm. The two grids are placed at a distance of 25 mm on each side of a platinum wire 0.1 mm in diameter.

A total current of 10 microamperes is collected under the influence of a high voltage of 10,000 volts applied to the platinum wire. The upstream current is 4.95 microamperes and the downstream current is 5.05 microamperes. The two separate amplifiers which serve to amplify the two currents are adjusted so that the output voltage is 5 volts on each grid.

A zero potential difference is then observed.

The device is then placed in a continuous circuit in which a flow of air takes place at a temperature of 18° C and at a pressure of 1013 millibars. The air is circulated within the circuit by means of a fan at different flow rates which are measured by means of an auxiliary instrument.

The following indications are obtained:

| | | | |
|---|---|---|---|
| 2.42 | volts | 22.6 | g/sec |
| 3.06 | volts | 28 | g/sec |
| 3.67 | volts | 34 | g/sec |
| 4.04 | volts | 37 | g/sec |
| 5.6 | volts | 51 | g/sec |

There is shown in FIG. 6 an electrode $E_1$ in the form of a grid constituted by parallel wires 44 which are secured to a frame 46.

In FIG. 7, the electrode $E_1$ is designed in the form of a grid 48 constituted by an interwoven assembly of crossed wires.

FIG. 8 shows an alternative form of part of the electronic device according to the invention in which the electrodes $E_2$ and $E_3$ are connected to the two input terminals 50 and 52 of a differential amplifier 54.

Figure 9A:
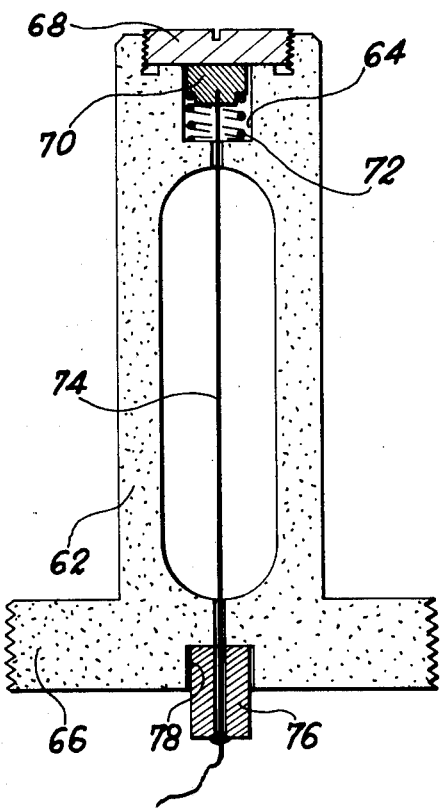
FIGS. 9a and 9b illustrate a device for fixing the wire which constitutes an electrode $E_1$.

FIG. 9 shows a mode of attachment of the wire comprising a mandrel 62, a recess 64 and a threaded head 66. The threaded end-cap 68 maintains the stud 70 against the spring 72. The wire 74 which constitutes the electrode $E_1$ is soldered to the stud 70. The other end of the wire 74 is soldered or bonded to the stud 76 which is fitted within the recess 78 of the threaded head 66. In order to apply tension to the wire within the mandrel 62, the spring 72, the stud 70 and the wire 74 are placed in position, the end of the wire 74 is passed out of the stud 76 and said wire is then secured to said stud. The threaded end-cap 68 is then unscrewed and the wire is stretched under the action of the spring 64.

Figure 9B:
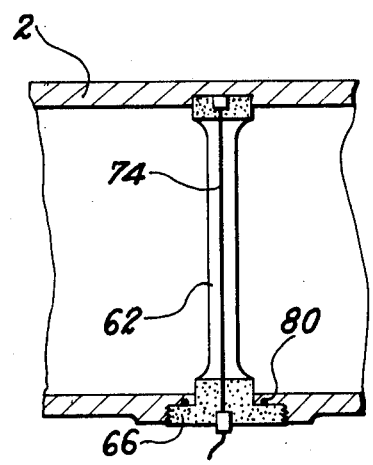

FIG. 9b shows the mandrel 62 in position within the tube 2. The seal 80 ensures fluid-tightness of the interior of the detector. In order to prevent substantial variations in the measurements, it frequently proves essential to apply by means of this device a constant tension to the wire which constitutes the electrode $E_1$.

A particularly advantageous application of the device in accordance with the invention consists in measuring the quantity of gas introduced into an engine. This measurement serves to regulate the quantity of gas introduced in dependence on the pressure (for example in the operation of motor vehicles according to the height above sea level) and the temperature of the gases at the intake as well as the quantity of air admitted. This measurement and the adjustment which is deduced therefrom can achieve savings of fuel of the order of 10 to 15%.

In this application, the mass flow of air is measured by means of the detector in the form of a current $\Delta i$ produced by the comparator and the amplifiers and integrated in time.

This detector can also be employed for controlling brake application in railway trains. In point of fact, in order to prevent coupling failures, the admission of air into the brake lines must be conrolled in dependence on the speed. By means of this device, the position of the air admission valve is adjusted so as to maintain a constant flow rate.

This detector has high sensitivity and can be employed for detecting leakages of gas in the vicinity of gas-works or gas storage installations.

What we claim is:

1. An ionization flow detector for measuring the flow velocity of a flowing gas stream comprising:
    first electrode means $E_1$ for emitting ions in directions parallel to the flow of said gas stream through the "Corona" effect;
    high voltage supply means for applying a high voltage to said first electrode means;
    second electrode means $E_2$ for collecting ions emitted from said first electrode means thereby generating a first current, said second electrode means being located directly up stream of said first electrode means;
    third electrode means $E_3$ for collecting ions emitted from said first electrode means thereby generating a second current, said third electrode means being located directly down stream of said first electrode means;

first amplifier means connected to said second electrode means and responsive to said first current for amplifying said first current;

second amplifier means connected to said third electrode means and responsive to said second current for amplifying said second current; and calculation means responsive to the outputs of said first amplifier means and said second amplifier means for generating an output which is proportional to the ratio of the difference of the outputs of said first and second amplifier means to the sum of the outputs of said first and second amplifier means, said ratio being proportional to the flow velocity of said flowing gas stream.

2. An ionization flow detector according to claim 1, wherein said first electrode $E_1$ is constituted by a wire of small diameter which is stretched across the gas stream.

3. An ionization flow detector according to claim 1, wherein said first electrode $E_1$ is constituted by a grid of wires of small diameter.

4. An ionization flow detector according to claim 1, wherein said first electrode $E_1$ is constituted by a pin whose extremity is located in the vicinity of a line connecting centroids of said second and third electrodes $E_2$ and $E_3$, said line being parallel to said flowing gas.

5. An ionization flow detector according to claim 1, wherein said first electrode $E_1$ has the shape of a flat disc of small diameter which is placed within said flowing gas.

6. An ionization flow detector according to claim 1, wherein said detector comprises:

guard rings connected to ground and surrounding portions of said second and third electrodes $E_2$ and $E_3$;

said first and second amplifier means are variable-gain amplifiers $A_1$ and $A_2$; and said calculation means comprises a comparator C having inputs connected to said amplifiers $A_1$ and $A_2$, said comparator C having an output proportional to the current difference between said two inputs.

7. An ionization flow detector according to claim 6, wherein said calculation means comprises:

a current adder A having inputs connected to said amplifiers $A_1$ and $A_2$ and producing an output proportional to the sum of said inputs, and a third amplifier $A_3$, in series with said comparator C, whose gain is inversely proportional to the output of said adder A.

8. An ionization flow detector according to claim 7 wherein said detector further comprises:

means for transmitting voltage pulses to the electrode $E_1$, a clock for measuring the time interval $T_1$ which elapses between a pulse received by at least one of the electrodes $E_2$ and $E_3$ and said pulse which is transmitted to the electrode $E_1$, and means for initially adjusting, in inverse ratio to the time interval $T_1$, the gain of said amplifier $A_3$.

9. An ionization flow detector according to claim 7 wherein said high voltage supply is a stabilized source of constant current.

10. An ionization flow detector according to claim 7 wherein the high voltage supply is a stabilized supply having a constant potential.

11. An ionization flow detector according to claim 7 wherein the high voltaage supply is a stabilized supply having a constant load line.

12. An ionization flow detector according to claim 1 wherein said detector further comprises integrator means responsive to said calculation means, for integrating said ratio so as to provide an output proportional to the total quantity of gas which has passed through the flow detector during an adjustable time interval.

* * * * *

UNITED STATES PATENT AND TRADEMARK OFFICE
CERTIFICATE OF CORRECTION

PATENT NO. : 3,996,795
DATED : December 14, 1976
INVENTOR(S) : Alfred SERVASSIER It is certified that error appears in the above-identified patent and that said Letters Patent are hereby corrected as shown below:

IN THE HEADING:

Under "Assignee", delete

"Institute Francaise du Petrole, des
Carburants et Lubrifiants et
Entreprise de Recherches et
d'Activities Petrolieres Elf", and insert --Entreprise de Recherches et
d'Activites Petrolieres ELF--.

Signed and Sealed this

Nineteenth Day of April 1977

[SEAL]

Attest:

RUTH C. MASON
*Attesting Officer*

C. MARSHALL DANN
*Commissioner of Patents and Trademarks*